United States Patent Office 2,966,468
Patented Dec. 27, 1960

2,966,468
PROCESS OF RECLAIMING SCRAP VULCANIZED RUBBER

Paul J. Dasher, Willoughby, Ohio, assignor to Dasher Rubber & Chemical Co., Fairport Harbor (Raynesville), Ohio, a corporation of Ohio No Drawing. Filed Oct. 9, 1959, Ser. No. 845,340

5 Claims. (Cl. 260—2.3)

This invention relates to an improved method of treating scrap vulcanized rubber in order to prepare or condition the same for revulcanization and re-use, that is to say, a method of reclaiming such rubber.

The present application is a continuation-in-part of my co-pending application, Ser. No. 503,349, filed April 22, 1955, the latter itself being a continuation-in-part of my previous application, Ser. No. 425,039, filed April 22, 1954, now Patent No. 2,853,742, granted September 30, 1958.

There are several well known processes for reclaiming scrap vulcanized rubber. These include thermo-mechanical means as well as thermo-chemical means. The thermo-mechanical means are accomplished by the use of a device for subjecting the vulcanized rubber to mechanical action such as a screw type machine or a Banbury mixer. Processes of this type are described in the patents to Robinson, 2,221,490, Sverdrup, 2,494,593 and Banbury, et al., 2,461,192. In these processes the scrap rubber is first cut into finely divided form as by means of a Foremost or Cumberland Grinder.

The Banbury mixer comprises essentially a pair of cylindrical chambers arranged side by side and in communication, within each of which is mounted a bladed rotor, and a pneumatically operated ram for holding the material to be treated within the sphere of action of the rotors. This form of mixer has found extensive use in the rubber industry for mixing and massing of rubber compounds. In the art of reclaiming rubber in Banbury mixers, the rubber particles are disintegrated by the action of the rotors until the particles cohere into a soft plastic mass. The action of the Banbury causes the temperature to rise and it may sometimes be necessary to add water to keep the temperature below that which will destroy the rubber. In the process of the Banbury et al. patent reclaiming utilized high horsepower of from 1.5 horsepower to 3 horsepower per pound of rubber. The temperature of the Banbury was permitted to go as high as 470° F. By the use of these high horsepowers in the Banbury mixer reclaim of good quality was obtained in a short time. The reclaim, however, required refining to remove particles not completely reclaimed.

My co-pending patent application, Serial No. 425,039, filed April 22, 1954, now Patent No. 2,853,742, issued September 30, 1958, discloses a process for preparing powdered rubber in the Banbury mixer which comprises subjecting the scrap vulcanized rubber in a Banbury mixer at high horsepower and relatively low temperatures for a period of time not exceeding approximately four minutes. The material resulting from this process is a powdered rubber at least 60% of which is sufficiently fine to pass a 40 mesh screen. In addition to this, the material is substantially different from that obtained by ordinary grinding practices. Besides the high proportion reduced to a fine mesh, the material on microscopic examination more nearly resembles a cube. In the customary grinding procedure the material is generally elongated such that while it may be made to pass a specific mesh, many of the particles may do so only by reason of passing through the mesh in end-to-end fashion.

It is an object of the present invention to provide an improved process for making reclaimed rubber of a quality not heretofore obtainable.

It is a further object of the present invention to provide an improved process for reclaiming vulcanized scrap rubber to produce reclaim of high quality without requiring a refining step.

It is a further object of the present invention to provide an improved process for reclaiming vulcanized scrap rubber and particularly automobile tires to obtain a product with a high tensile strength not requiring refining.

These and other objects are attained by the present invention which comprises cold grinding of defibered whole tire rubber scrap, or the like vulcanized rubber scrap in a Banbury mixer, sifting the product and treating all the material passing a 20 mesh screen in a hot Banbury mixer until it is reclaimed.

*Example I*

Cut up whole tire stock which had been defibered in a chemical defibering operation and weighing 128 pounds was mixed with 19 pounds of carbon black and placed in a Banbury mixer. The Banbury running without load utilized 60 kilowatts or approximately 80 horsepower. The ram was put down and the power consumption quickly went up to a peak of 615 kilowatts or about 825 horsepower. The actual grinding time was 1½ minutes although the total elapsed time from the time the ram was put down until it was taken up was about 2 minutes. Cold water (34° F.) was circulated in the jacket of the Banbury mixer and the temperature in the mixer went to a peak of 302° F.

The material was removed from the Banbury and sifted to remove all particles which would not pass a 20 mesh screen. The particles passing the 20 mesh screen were so fine that in a test sample only about 16% were retained on a 40 mesh screen. The particles passing the 20 mesh screen were then put back into the Banbury mixer which was not supplied with cold water in the jacket. The ram was put down and the material worked for an actual working time of 7½ minutes. The power went to a peak of 560 kilowatts or about 752 horsepower. The temperature reached about 450° F. at the peak. The reclaim obtained from the second step in the Banbury mixer was sheeted on rubber rolls and was found to be of uniformly good quality such that no refining was necessary.

*Example II*

Cut up whole tire stock which had been defibered in a chemical defibering operation and weighing 128 pounds was mixed with 19 pounds of carbon black and placed in the Banbury mixer used in Example I. The ram was put down and the power consumption went to a peak of 630 kilowatts or about 854 horsepower. The actual grinding time was approximately 1 minute whereas the overall elapsed time from putting down the ram until it was taken up was about 1½ minutes. The average overall power was 418 kilowatts or about 563 horsepower. Cold water (34° F.) was circulated in the jacket of the Banbury mixer and the temperature of the mixer went to a peak of 307° F.

The material was removed from the Banbury and sifted to remove all particles which would not pass a 20 mesh screen. The particles passing a 20 mesh screen were then put back into the Banbury mixer which was now not supplied with cold water in the jacket. The ram was put down and the material worked for an actual working time of 4.9 minutes. The power went to a peak of 730 kilowatts or about 980 horsepower. The temperature reached about 532° F. at the peak.

A sample of the reclaim produced in accordance with this example was sheeted in a roll mill and found to be of good quality free of unreclaimed particles and not requiring refining.

Since approximately 65% of all rubber reclaim is consumed in the manufacture of tires, the reclaim produced in accordance with Example I was tested in a carcass tire formulation. There was first prepared a typical quality crude stock as follows:

| Ingredients | Parts by Weight |
| --- | --- |
| #3 Smoked Sheets | 100.0 |
| FEF Black | 40.0 |
| Zinc Oxide | 5.0 |
| Sulfur | 3.0 |
| Stearic Acid | 2.0 |
| MBTS (ben othiazyl disulfide) | 1.0 |
| Thionex (tetramethylthiuram monosulfide) | 0.2 |
| Process Oil (petroleum hydrocarbon mixture, having a viscosity at 100° F., in the range of 50-165 seconds) | 10.0 |

The whole tire reclaim of Example I was then formulated separately as follows:

| Ingredients | Parts by Weight |
| --- | --- |
| Whole tire reclaim | 181.8 |
| Zinc Oxide | 5.0 |
| Sulfur | 3.0 |
| Stearate Acid | 2.0 |
| Process Oil (petroleum hydrocarbon mixture, having a viscosity at 100° F., in the range of 50-165 seconds) | 10.0 |
| MBTS (benzothiazyl disulfide) | 0.25 |
| Thionex (tetramethylthiuram monosulfide) | 0.05 |

These two formulations were mixed according to standard Banbury laboratory cycles and test slabs cured. Test results were as follows:

| Percent Re-Claim Cmpd. | Percent Crude Compd. | Tensile | Modulus at 400% | Percent Elong. | Cold Tear, #/in. | Hot Tear |
| --- | --- | --- | --- | --- | --- | --- |
| 100 | ------ | 1,990 | 960 | 580 | 223 | 134 |
| 90 | 10 | 2,170 | 1,000 | 590 | 168 | 121 |
| 80 | 20 | 2,520 | 1,140 | 605 | 194 | 151 |
| 70 | 30 | 2,620 | 1,260 | 590 | 164 | 184 |
| 60 | 40 | 2,660 | 1,650 | 550 | 184 | 111 |
| 50 | 50 | 2,800 | 1,680 | 550 | 200 | 154 |
| 40 | 60 | 2,900 | 2,000 | 550 | 202 | 139 |
| 30 | 70 | 2,900 | 2,070 | 550 | 256 | 154 |
| 20 | 80 | 2,900 | 2,180 | 550 | 258 | 144 |
| 10 | 90 | 2,900 | 2,330 | 550 | 228 | 145 |
| ------ | 100 | 2,900 | 2,450 | 480 | 205 | 195 |

While the above examples give maximum temperatures reached, it will be understood that the temperatures may vary reasonably within certain ranges. The process may be broadly described as a combination of a "cold grind" and a "hot reclaim." Thermocouple temperature charts indicate substantial back and forth fluctuation of the temperature within general ranges. For the "cold" grinding step the range is preferably from about 100° F. to about 320° F. For the "hot" reclaiming step cold water is used in the jacket of the Banbury and the temperatures fluctuate generally in the range 200° F. to 550° F. It must be clearly understood that the fluctuations are such as to ensure that the temperatures maintained in the "cold" step are below those maintained in the "hot" step. The results achieved by the invention would not be obtained if, for example, the "cold" grinding takes place at 320° F. and the reclaiming step at 200° F. The temperature conditions to be maintained in each stage may best be referred to in terms of an average temperature. Thus, for the grinding step the average should be in the range 150° F. to 250° F. and preferably about 200° F.; and for the reclaiming step the average temperature should be from 300° F. to 400° F. and preferably about 350° F.

While the above examples have utilized whole tire stock as the starting material, other types of vulcanized rubber may be treated in accordance with the process of the present invention. Other forms of tire stock such as tire buffings may be used and this material may be in small particle size averaging approximately 6 mesh. Other materials include gas ball stock. This material is available in a ground form having pieces of approximately 4 mesh. With a "cold" grinding in the Banbury for approximately 2 minutes, products have been obtained having a particle size such that less than 2% are retained on a 40 mesh screen and in some cases all of the product passed through a 40 mesh screen. Vulcanized latex sponge may be used.

The rubber may be vulcanized natural rubber as well as vulcanized synthetic rubbers such as the butadiene copolymers known as Buna–S and Buna–N, the copolymer of isobutylene and isoprene known as Butyl rubber, polychloroprene known as Neoprene, mixtures of such polymers and copolymers, and mixtures of any of these with vulcanized natural rubber.

In its preferred form the invention is applicable to whole tire scrap both because this material is abundant and because the material is usually composed of two types of rubber such that obtaining a uniform reclaim product has been difficult. The two types of rubber are found in the tread and in the carcass. In order to best utilize the whole tire it should first be defibered and a preferred method for this purpose is set forth in my U.S. Patent No. 2,701,268 issued February 1, 1955.

A grinding agent is desirable in the grinding step. Certain scrap rubber may contain sufficient materials suitable for grinding without any additional grinding agent. In the case of the whole tire stock above a small percentage of carbon black has been added. Other grindings aids may be used but they are not essential to the invention.

In order to enable the scrap rubber to be subjected to the requisite internal shearing action under the influence of the bladed rotors of the Banbury machine, the rotors are preferably driven at a speed of 100 to 150 r.p.m. while at the same time, the mass is compressed in the working chamber of the machine under a mechanical pressure of at least 150 pounds and preferably 170 pounds per square inch by the use of the ram. Under these conditions the power input resulting from the action of the rotors generally will average at least 3 horsepower per pound of the materials being treated. In general, the input of energy should average not less than 1.5 horsepower per pound of scrap.

Rubber which has been described as "finely ground" has previously been reclaimed in a Banbury mixer. Sometimes such material has been described as being as fine as 20 or 24 mesh. The product produced by the first step in the process of the present invention distinguishes from this material in two ways. In the first place, the present material may be described as powder, at least 60% of which is sufficiently fine to pass a 40 mesh screen. Commercial grades of "finely ground" rubber have been found to contain a maximum of 33% which will pass a 40 mesh screen. In addition, the material ground by the conventional methods tends to be elongated so that while it may have the prescribed mesh size in two dimensions, it may be several times as large in the other dimension. The product of the first step of the present invention is more nearly cubical or is roughly the same size in all dimensions.

In carrying out the first, or grinding, step of my process, it is desirable, and in most instances preferable, that a grinding agent be added to the starting batch of scrap. In the case of whole tire scrap, the addition of a grinding agent, such as carbon black of small particle size, in an amount preferably of from 10% to 20% based on the weight of the rubber, greatly facilitates the reduction of the scrap to the form of a finely divided powder. The presence of such carbon black during the grinding step yields a powdered rubber, at least 60% of which, preferably 80%, passes a 40 mesh screen. Where the presence of large amounts of carbon black in the final product is not desired, substantial amounts of the carbon black present in the ground rubber obtained in the first step may be removed therefrom, desirably as by passing the material from that step over a 100 mesh screen to remove the fines, which carry a large percentage of the carbon black initially added. These fines may be subsequently used, or recycled for use, in the grinding step.

I claim:

1. A process for reclaiming defibred whole tire scrap vulcanized rubber to obtain a reclaim product requiring no refining, which consists essentially of the successive steps of: (1) subjecting a mass of such scrap to intense shearing action in a confined working space while exerting mechanical pressure on the mass to compact and densify the same for a period of about one to about four minutes, while preventing the temperature of the mass during such period from exceeding an average in the range of from 150° F. to 250° F., whereby to convert said mass into finely divided powder without significant devulcanization of the rubber, at least 80 percent of the powdered rubber being sufficiently fine to pass a 40 mesh screen; (2) separating from the powder the portion thereof which passes a 20 mesh screen; (3) subjecting said portion of the powder to additional such shearing action for a period of about 5 to 8 minutes, during which period the temperature of the mass is maintained at an average in the range of 300° F. to 400° F., whereby to devulcanize the rubber; and (4) sheeting the resultant mass.

2. A process as defined in claim 1, wherein step (1) thereof is performed in a Banbury machine in which the ram pressure exerting the mechanical pressure upon the mass is sufficiently high to bring about a power input averaging not less than 1.5 horsepower per pound of the scrap, and wherein step (3) thereof is performed in a Banbury machine in which the average temperature specified for said latter step is maintained in the mass undergoing the shearing action of said step.

3. A process as defined in claim 2, wherein the temperature of the mass during step (1) thereof is maintained at an average of about 200° F., and the temperature of the mass during step (3) thereof is maintained at an average of about 350° F.

4. A process for reclaiming defibred whole tire scrap vulcanized rubber to obtain a reclaim product requiring no refining, which consists essentially of the successive steps of: (1) subjecting a mass of such scrap to intense shearing action in a confined working space while exerting mechanical pressure on the mass to compact and densify the same for a period of about one to about four minutes, while preventing the temperature of the mass during such period from exceeding an average in the range of from 150° F. to 250° F., whereby to convert said mass into finely divided powder without significant devulcanization of the rubber, at least 60 percent of the powdered rubber being sufficiently fine to pass a 40 mesh screen; (2) separating from the powder the portion thereof which passes a 40 mesh screen; (3) subjecting said portion of the powder to additional such shearing action for a period of about 5 to 8 minutes, during which period the temperature of the mass is maintained at an average in the range of 300° F. to 400° F., whereby to devulcanize the rubber; and (4) sheeting the resultant mass.

5. A process as defined in claim 4, wherein a grinding agent comprising fine particle size carbon black is added to the mass of said scrap in said step (1) in an amount of from 10% to 20% by weight of the rubber.

No references cited.